United States Patent [19]

Ashley

[11] Patent Number: 5,147,983
[45] Date of Patent: Sep. 15, 1992

[54] SIX PHASE DISTRIBUTION POWERLINE

[76] Inventor: James R. Ashley, 2523 Lake Ellen La., Tampa, Fla. 33618

[21] Appl. No.: 762,566

[22] Filed: Sep. 16, 1991

Related U.S. Application Data

[62] Division of Ser. No. 633,459, Dec. 24, 1990.

[51] Int. Cl.$^5$ ............................................. H01B 7/34
[52] U.S. Cl. ........................................ 174/104; 174/41; 174/70 A; 174/79; 174/103; 174/115
[58] Field of Search ............. 174/103, 104, 115, 70 A, 174/41, 79

[56] References Cited

U.S. PATENT DOCUMENTS

| | | | |
|---|---|---|---|
| 1,852,127 | 4/1932 | Palmer | 174/115 |
| 3,322,889 | 5/1967 | Bird et al. | 174/113 R |
| 3,328,510 | 6/1967 | White | 174/41 |
| 3,809,802 | 5/1974 | Pearson | 174/103 |
| 4,255,609 | 3/1981 | Charlebois et al. | 174/41 |
| 4,467,138 | 8/1984 | Brorein | 174/115 |
| 4,570,477 | 2/1986 | Sugibuchi | 174/115 X |
| 4,663,496 | 5/1987 | Peek, Jr. | 174/41 X |
| 4,856,867 | 8/1989 | Gaylin | 174/41 X |
| 5,070,441 | 12/1991 | Ashley | 363/154 |

Primary Examiner—Morris H. Nimmo
Attorney, Agent, or Firm—David A. Kiewit

[57] ABSTRACT

Apparatus is provided for six-phase distribution of high voltage electrical power. The invention provides new six phase distribution wiring, using coaxial conductors, that is configured to reduce fringing electric and magnetic fields when used either as part of an overhead distribution system, or when buried underground.

10 Claims, 5 Drawing Sheets

SIX PHASE DISTRIBUTION POWERLINE

This application is a division of U.S. patent application 07/633,459, which was filed on Dec. 24, 1990 by the same inventor.

BACKGROUND OF THE INVENTION

Electrical power is distributed from central generating plants to homes, offices, and factories as three phase alternating current. Concerns for the environment have motivated engineering research to improve power generation efficiency. In addition, there have always been efforts directed at improving power system efficiencies by reducing line losses. Since the power lost in the phase conductors is given by the square of current times the resistance, it is obvious that either increasing conductor diameter or the number of conductors (known as using a conductor "bundle") will reduce the "I squared R" losses. However, making these changes by themselves for three phase powerline does not change the fringing magnetic field under and near the powerline. Thus, eddy current losses in nearby water pipes, losses from inductive coupling to fences, etc., will not be changed. Furthermore, increasing wire diameter or adding paralleled conductors on the same crossarms will significantly increase the fringing electric field.

In recent years there has been an increasing public concern about possible biological effects of the low frequency electric and magnetic fields associated with the distribution and use of electrical power. If an engineering change is made to improve efficiency which, as in the example discussed above, will carry the disadvantage of increasing fringing electric or magnetic fields, it will meet with strong political opposition. Efficiency improvements must be coupled with fringing field reduction.

In discussing public health issues related to power lines, it is convenient to consider two classes of power lines:

1) Urban distribution lines running from a substation to distribution transformers located near the point of use, and commonly operated at 10 to 50 kV.

2) Urban and rural transmission lines that supply power from generating stations to substations and that are commonly operated at voltages above 69 kV.

Although much of the most recent public outcry has been directed at the second category of power transmission lines listed above, the 10–50 kV distribution lines may be more significant because of the vastly greater number of people exposed. Distribution lines in the 10–50 kV category, if mounted on poles, can give rise to electrical fields of as much as 20 V/m, and magnetic fields as high as 1.3 micro-tesla when measured on the ground below the lines. Maintenance workers, such as tree trimmers who work near the 10–50 kV distribution powerlines, receive a significantly higher exposure of both electric and magnetic fields.

The issue of fringing fields from 10–50 kV lines has a well known solution that is not always economically feasible—underground utilities. Both theory and measurements show that placing all three phase conductors and the neutral in a common conduit provides nearly perfect magnetic and electrostatic shielding. Underground utilities are also recommended by their improved reliability, appearance, and safety from accidental electrocution. These factors have led to their widespread use in new construction. A major question in the controversy over possible health risks from fringing fields is whether to rebuild existing distribution lines and to literally bury the supposed problem. A method of reducing or eliminating fringing fields while using existing pole-supported open wires could provide an economically attractive alternative method of resolving the political problem.

The relative magnitude and rate of fall-off of both the fringing electric and magnetic fields is directly proportional to conductor spacing and, for distances beyond about 10 times the conductor spacing, inversely proportional to distance squared. For example, one can consider the significant difference of the fringing magnetic field measured near two types of 120/240 service drops to residences. In installations made before about 1950, all three wires running from the utility pole to a house were supported on individual insulators. Conductor separation was of the order of 30 cm. As insulating material became more weather resistant, this construction was replaced by a cable consisting of a support wire and the two "hot" wires, which are wrapped around the support wire in a spiral fashion. In this newer design, conductor separation is reduced to about 3 cm. This reduction of conductor-conductor spacing reduces fringing fields measured on the ground under the service drop to about 1/10 of the value found for the old wiring technique and increases the rate of fall-off away from the service drop.

A typical three-phase distribution circuit is four wire, wye connected. A neutral conductor is found in both overhead and buried distribution powerlines. The neutral is used for carrying the unbalanced current as well as for safety purposes. In a dense urban area, the three phase distribution circuit will have on the order of one hundred single phase distribution transformers. These are often connected from phase conductor to neutral. About one third of the total number of transformers is connected to each phase conductor with the object of balancing the load between the three phases and thereby minimizing neutral current. It is well know in the theory of three phase systems that a balanced load, i.e., a load that has equal current magnitudes and power factor angles for each phase, has zero current in the neutral.

The prior art three-phase distribution powerlines often have banks of wye-connected capacitors distributed along the circuit. The purpose of these capacitors is to draw a leading current to offset the lagging current of inductive loads, such as refrigeration motors. The leading current offsets the lagging current to bring the power factor closer to unity and minimize the total current in the distribution powerline, thus minimizing powerline I squared R loss.

The foregoing discussion is directed toward powerlines made of several parallel conductors. Another widely used transmission line design is "coaxial", which is widely used when electrostatic shielding is important. The adaptation of coaxial lines to the fringing field-free transmission of three-phase electric power has been discussed in my co-pending application (U.S. Pat. No. 07/578,215) which is incorporated herein by reference.

Coaxial transmission lines have a higher capacitance per unit length than do parallel lines, and will hence have a higher leading power factor angle. In a 10–50 kV distribution line this may not be a problem, as both fluorescent lights and induction motors operate with a lagging power factor that the coaxial line may offset. Consequently, the added capacitance of the coaxial transmission line reduces power loss by correcting lagging power factors.

It is instructive to consider the fringing magnetic fields associated with both the parallel wire and coaxial transmission lines. For the two parallel wire case one can show from electromagnetic theory that, for all locations that are further away from the transmission line than ten times the inter-conductor spacing, the magnetic intensity is directly proportional to line spacing and inversely proportional to the square of distance. That is, near the conductors the electric and magnetic fields are intense, but once one moves away more than ten times the conductor spacing, the fields become rapidly weaker. Magnetic intensity varies inversely with the square of distance. Thus, for prior art three phase power transmission lines, the general rule is that reduction of fringing fields accompanies close conductor spacing. This accounts for the negligible magnetic fields on the surface of the ground above three-phase distribution powerlines buried in a common conduit or duct. Of course, other factors enter into the engineering choice of conductor spacing. Thus, reducing fringing fields by reducing conductor spacing has some very practical limitations such as arcing between phase lines.

For the case of the coaxial line, one finds complete electrostatic shielding of the inner conductor by an outer conductor, and transmission line theory shows that if the return current flows in the outer conductor, there is no magnetic field outside the transmission line. This holds even for the outer conductor material being copper or other non-ferromagnetic material. For three phase power lines, the use of a separate coaxial line for each phase would not eliminate fringing magnetic fields, because one would generally find that the return current flowing in the outer conductor was not equal in magnitude to the forward current. In a co-pending patent application, OVERHEAD THREE-PHASE POWER LINE ELIMINATING FRINGING ELECTRIC AND MAGNETIC FIELDS, Ser. No. 07/578,215, Sep. 6, 1990, the present inventor taught methods of insuring an equality between the forward and reverse currents in the two conductors. The teachings of 07/578,215 have a further significant disadvantage, in that the return current flowing in the outer conductor of the coaxial cable consumes power which would not normally be consumed in three phase power transmission.

OBJECTS OF THE INVENTION

It is an object of the invention to provide method and apparatus for the overhead distribution of multi-phase alternating electric current that decreases electrical and magnetic fields at both the fundamental and at higher harmonic frequencies when these fields are measured one meter above the surface of the earth under and adjacent to the power line.

It is a further object of the invention to reduce or eliminate health risks attributed to fringing magnetic fields in a manner that is compatible with existing installed overhead distribution facilities, and more economical than other known expedients, such as burying urban distribution cabling in conduits.

It is a further object of the invention to provide an electric distribution wiring method and apparatus that has resistive losses substantially less than those found in prior art distribution wiring operated at the same power level.

It is yet a further object of the invention to provide an electric distribution wiring method and apparatus that improves the efficiency of power distribution by reducing losses in neutral conductors.

It is yet a further object of the invention to improve electrical power transmission efficiency by partial correction of power factor for inductive loads.

It is yet a further object of the invention to reduce eddy current losses in conducting bodies, such as pipelines, that may be buried near a powerline.

It is yet a further object of the invention to reduce the loss of power that is inductively coupled to structures, such as fences, that may be near a powerline.

It is another object of the invention to provide an electrical distribution wiring method and apparatus that is less vulnerable to being taken out of service by lightning strikes than is the case for prior art three phase overhead distribution systems.

It is another object of the invention to provide improved power transmission and distribution wiring and methods that are compatible with the existing prior art three phase electric power transmission and distribution systems.

It is a further object of the invention to allow rebuilding of one distribution circuit at a time while using existing poles, crossarms, and phase conductors.

It is another object of the invention to reduce the hazard of electrocution by accidental contact of metal ladders, kites, TV antennas, etc., with the high voltage overhead distribution powerline.

DETAILED DESCRIPTION

A co-pending U.S. Pat. application (Ser. No. 07/594,061, filed Oct. 9, 1990) by the present inventor, which is incorporated herein by reference, teaches arrangements of six phase transmission line conductors to reduce fringing electric and magnetic fields under and near an overhead powerline comprised of parallel conductors. That application's teaching bears on high voltage transmission and distribution powerlines where the sources and the loads, typically substations, are three phase transformer banks. The present invention extends these teachings to the electric power distribution system and teaches apparatus and methods for connecting single phase loads to the distribution system while keeping fringing fields low.

Figure 1:
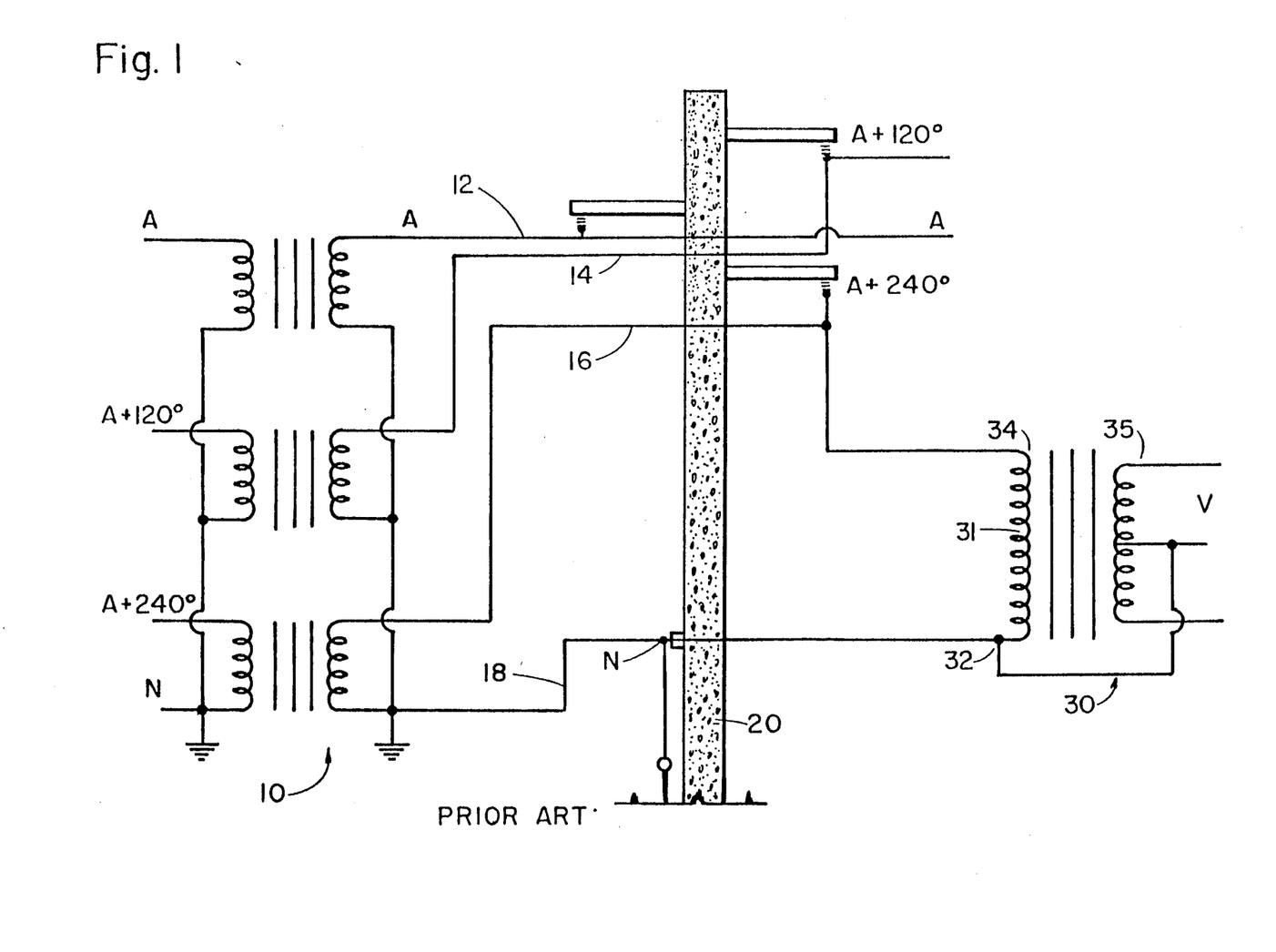
FIG. 1 of the drawing presents a prior art three-phase, four wire, wye connected, electrical power distribution arrangement that uses open wires supported on overhead poles.

Turning now to the drawing, one finds in FIG. 1 a schematic representation of a prior art wye connected three phase distribution system, comprising a substation 10, a set of conductors, including phase conductors 12, 14, 16 carrying currents with phases indicated as A, A+120° and A+240° and a neutral conductor 18 mounted on poles 20, and a typical load transformer 30. At the point of use, particularly for residences, a single phase transformer 30 with primary windings 31 connected between one of the phase conductors 12, 14, 16 and the neutral conductor 18. This transformer has a center tapped secondary winding 35 to provide 120/240 V for lighting and appliances.

Figure 2:
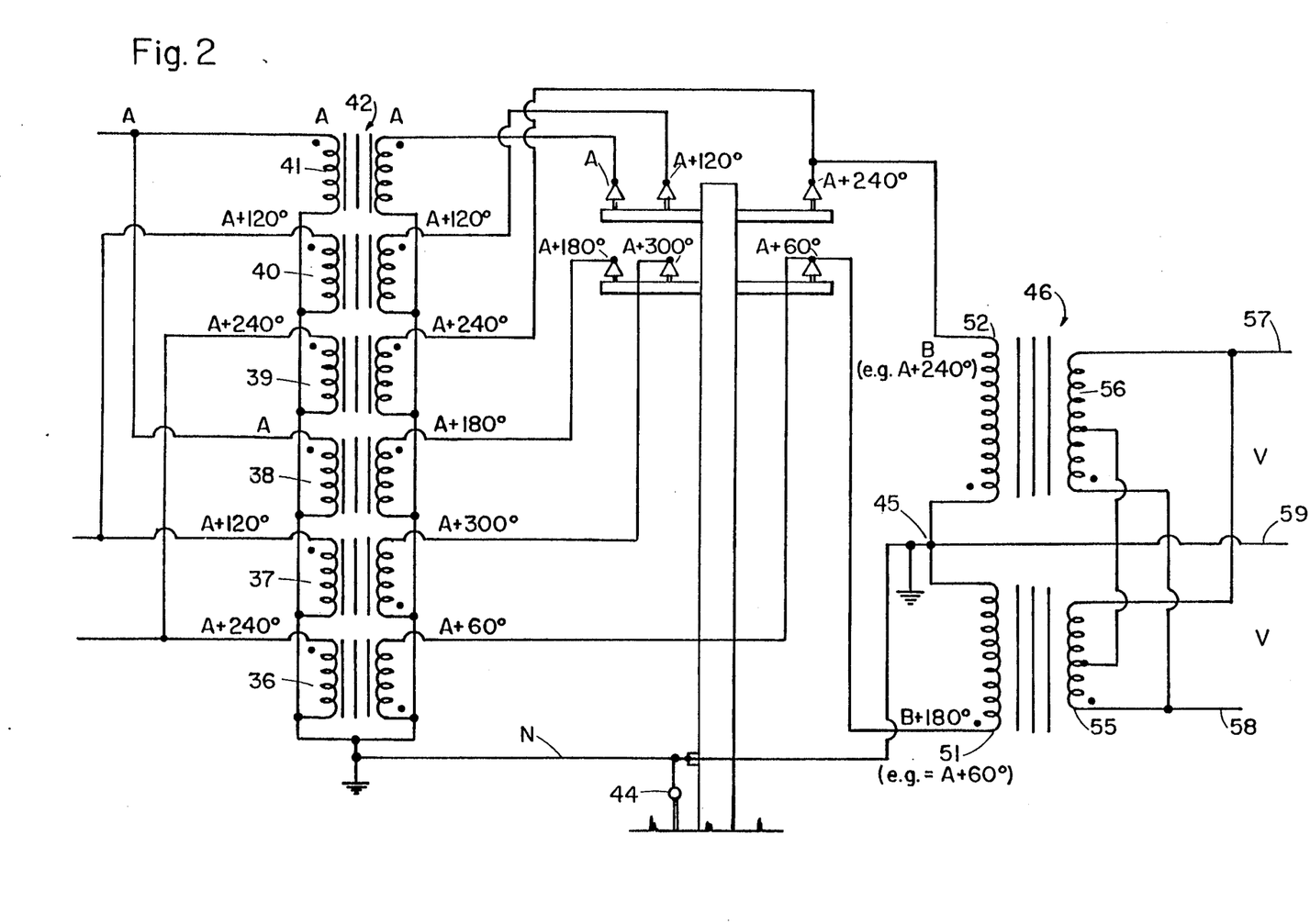
FIG. 2 of the drawing is a schematic representation of a 6 phase open wire overhead distribution circuit that uses paralleled transformer secondaries at the point of use.

A comparable and compatible six phase distribution system is shown in FIG. 2 of the drawing, wherein many sections of the wires have been omitted for the sake of clarity, and where the phasing of the various conductors is indicated by A, A+60°, A+120°, A+180°, A+240°, and A+300°. The connections for the source transformers 36–41 and the arrangement of the six phase conductors, as taught in the aforementioned patent application, Ser. No. 07/594,061, significantly reduces both the fringing electric field and the fringing magnetic field below the powerline as well as in the region nearby where a residential building might be located. A neutral wire, generally indicated as N, is grounded at the source transformer array at 42, by ground rods 44 at some of the poles, and at the connection 45 to the load transformer pair 46. This neutral conductor, though not strictly necessary for the six-phase powerline, will subsequently shown to be useful for protecting and improving the reliability of the powerline.

The single phase load distribution transformer pair 46 in FIG. 2 have identical primary windings with connections 51, 52 to two phases of the six phase power line that differ by 180°. The phase connections 51, 52 are indicated, respectively, as B and B+180°, where B may be A, A+120° or A+240°. The identical secondary windings 55, 56 of the transformers 46 provide a single phase output, labeled V (commonly 120 Volts), between either of output conductors 57, 58 and the common center-tapped neutral connection 59.

Figure 3:
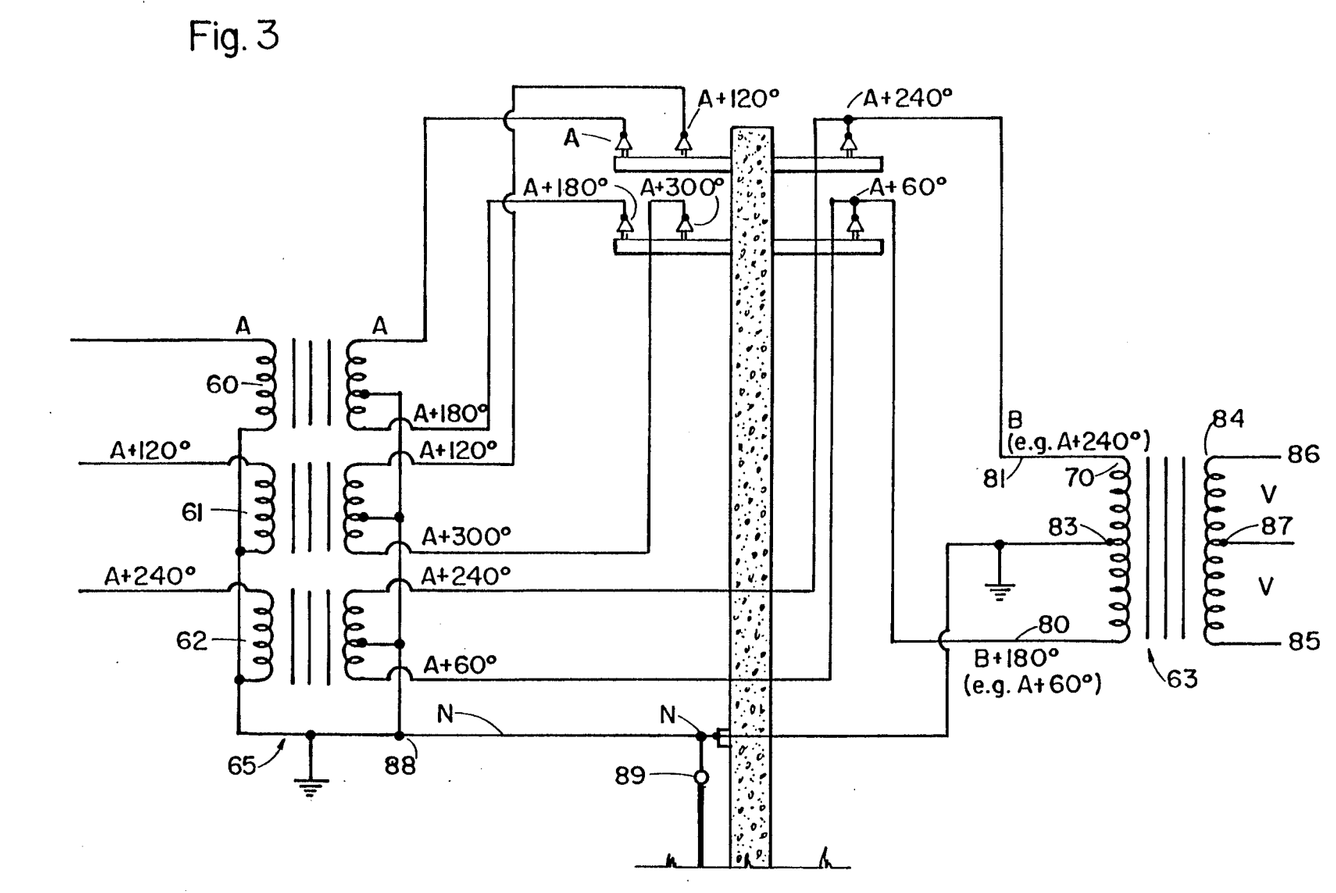
FIG. 3 of the drawing is a schematic representation of a 6 phase open wire overhead distribution circuit that uses center-tapped transformers at the point of use.

Refer now to FIG. 3 of the drawing wherein is shown another embodiment of the present invention that uses center tapped transformers 60, 61, 62, 63 both in the source substation 65 and for the load at point of use. The primary winding 70 of load transformer 63 of FIG. 3 is connected at 80 and 81 between two phases B and B+180° of the six phase power line, where B may be A, A+120° or A+240°. The winding 70 is center-tapped, and the center tap 83 is connected to the neutral conductor N of the power line. The secondary winding 85 of the transformer 63 provides a single phase output, labeled V (commonly 120 Volts), between either of output conductors 86, 87 and the common center-tapped neutral connection 88. FIG. 3 shows a neutral conductor, generally designated as N, that has a grounded connection 89 to the center taps of the source transformers 65, a connection 83, which may be grounded, at the load transformer, and a number of intermediate grounds 89 at selected poles. As noted in the preceding discussion of FIG. 2 of the drawing, this neutral conductor is not strictly required for the operation of the six phase power line, but is useful for lightning protection and for improved power line reliability.

The embodiment of FIG. 3 preserves all of the advantages of the embodiment of FIG. 2. In particular, the absence of 60 Hz and 180 Hz current in the neutral conductor is a significant system advantage. It should be obvious to one skilled in the art of power distribution that the substations of FIGS. 2 and 3 can be interchanged; furthermore, a mixture of center-tapped and paralleled secondary single phase transformers can be used to supply the single phase loads fed by the substations of either FIG. 2 or FIG. 3.

The fringing magnetic field associated with the circuits of FIGS. 2 and 3 are also reduced below that of the circuit of FIG. 1 because the current in each phase conductor is reduced. That is, if a three phase circuit is replaced by a six phase circuit using the same conductor wire diameter and material and operated at the same phase to neutral voltage, then for the same total load power, the current in the six phase conductors will be one-half the current in the three phase conductors. Since power loss is $I^2R$, the loss per conductor in the six phase circuit will be $\frac{1}{4}$ of that of the three phase circuit. However, there will be twice as many conductors, so the total line loss will be half of that for the corresponding three phase line.

The single phase load transformers 50, 63, shown in FIGS. 2 and 3, are always connected so that the bottom leads 51, 80 of the primary winding are 180° out of phase with the top leads 52, 81. Thus, the first of a series of loads would be connected between the 6 phase conductors A and A+180°, the next between A+120° and A+300°, and the next between A+240° and A+60°, etc. If the single phase transformers are identical, then regardless of the balance or lack of balance of the load on the secondary, the instantaneous current in the top primary winding is equal to the current in the bottom primary winding. Thus, there is no current in the 6 phase neutral conductors 54, 83 for any of the single phase loads indicated schematically in FIG. 2 and 3.

Additionally, there is an advantage over prior art three phase wye connection in that even if the loads on phases A-A+180°, B-B+180°, and C-C+180° are not balanced, there will still be no current in the neutral conductor. This means no power loss (I squared R loss) in the neutral. Furthermore, there will not be a third harmonic (180 Hz) magnetizing current from the load transformers flowing in the neutral. Thus, the 180 Hz component of fringing magnetic field will be significantly reduced.

Three phase loads, such as a large capacity air conditioner or food refrigeration system, can be connected to the six phase distribution system by recourse to transformers such as those indicated as 36–41 in FIG. 2 or as 60–62 in FIG. 3. The preceding discussion treated those transformers as being located in substations 40 or 65 where power from a three phase source was coupled into a 6 phase transmission system. It will be apparent to those skilled in the art that transformers having the same configurations, albeit with differing turns ratios, can be used to distribute power from a six phase line to a three phase load.

Another significant advantage of the arrangements of FIGS. 2 and 3 is that the neutral conductors, indicated generally as N, are available for prior art lightning protection. This protection is provided by grounding the neutral connections 42 and 88 at the source transformers, by providing grounds 44, 89 at intermediate locations along the powerline, and by grounding the connections 45, 83 at the load transformers. Furthermore, if lightning or accident takes out one of the phase conductors, even the affected phase may continue to operate because the other half of the load transformers on the affected phase can draw the total power from the antiphase conductor of the pair. Reliability of the six phase circuit is thus predicted to be better than for the three phase circuit that it replaces.

Note that if it were not for lightning protection and other safety and redundancy considerations, the neutral conductors and their grounds, as shown in FIGS. 2 and 3 of the drawing, could be omitted, since no current is carried by the neutral conductor.

Figure 4:
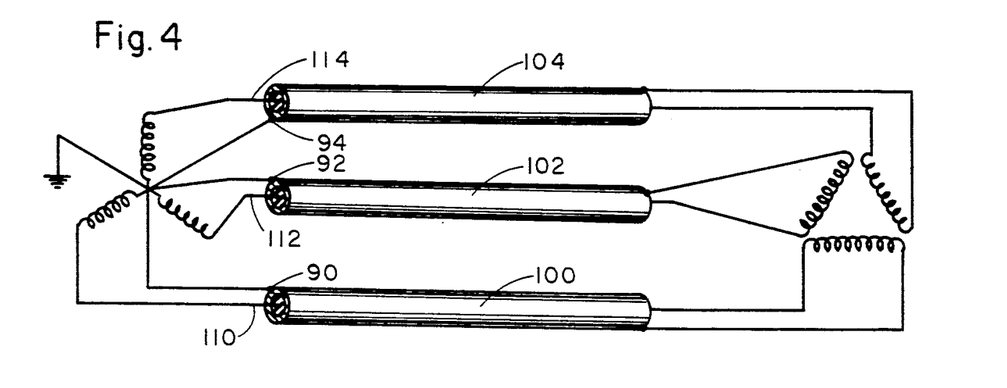
FIG. 4 is a schematic representation of a three phase power line configuration made of coaxial cables arranged so as to minimize fringing fields.

Refer to FIG. 4 wherein a representation of a three phase coaxial power transmission arrangement as taught in the inventor's co-pending U.S. patent application Ser. No. 07/578,215 is shown. This arrangement provides control of fringing fields by insuring that the return current flowing in each of the outer conductors 90, 92, 94 of the three coaxial cables 100, 102, 104 comprising a three phase powerline is equal in magnitude to the primary current carried by the corresponding center conductors 110, 112, 114. As noted previously in this writing, this design had a significant disadvantage, in that the return current flow in the outer conductor of the coaxial cable caused I squared R loss.

Figure 5:
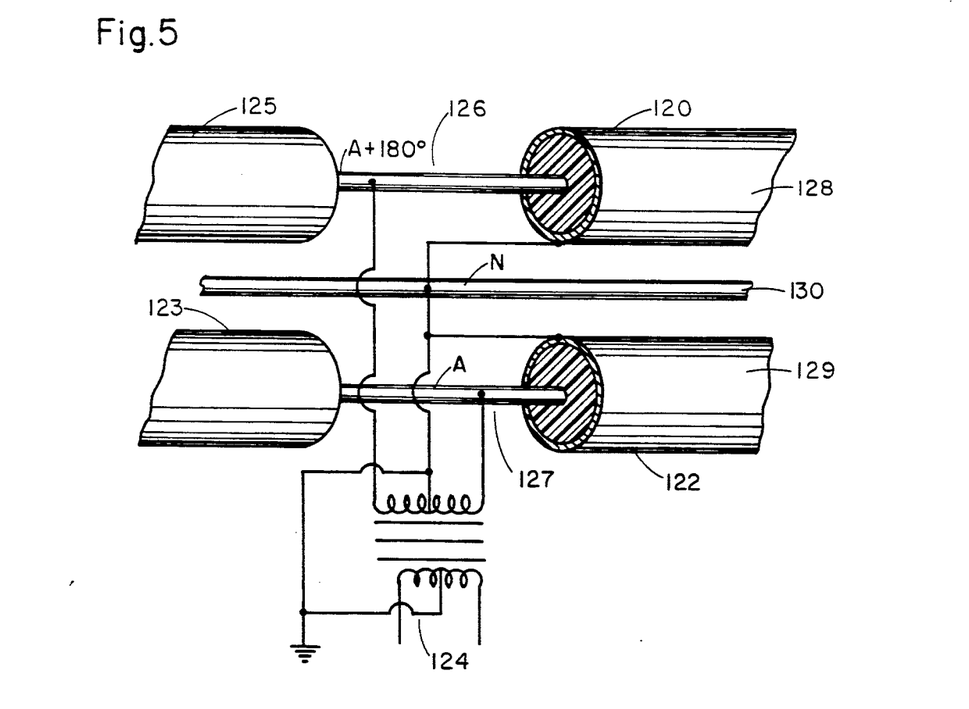
FIG. 5 of the drawing illustrates the coupling of a single phase load to a two coaxial conductors.

To overcome this disadvantage and to bring about other significant advantages, one may consider the arrangement, shown in FIG. 5 of the drawing, for grounding the coaxial shield segments 120, 122 and connecting a single phase load 124 to the center conductors 126, 127 that form an antiphase pair of generally coaxial cables 128, 129 that are part of a six phase distribution system. The other conductors in this system have been omitted from FIG. 5 for the sake of clarity. The connections from the center conductors 126, 128 of FIG. 5 to the single phase load transformer 124 are substantially the same as those taught for the parallel wire distribution circuit that was previously presented in FIGS. 2 and 3. Note that the shield segments 120, 122 are continuous only between adjacent connection points, and do not bridge a connection point, such as that shown in FIG. 5. FIG. 5, moreover, illustrates a novel method of grounding the neutral conductor 130 and shield segments 120, 122 that avoids current flow in the sheath, and that thereby avoids the power losses that occur in the teachings of the above referenced 07/578,215 application. Only one end of each shield segment 120, 122 is grounded, as shown in FIG. 5. The ends of the other shield segments 123, 125 are not grounded at the connection point illustrated in FIG. 5. Unless shield segments 123, 125 extend from the source to the initial single phase load, they are grounded at another connection point in the manner shown in FIG. 5 for segments 120, 122. The shield segments extending from the source to an initial connection point are grounded at the source as shown for the corresponding three-phase case in FIG. 4. Additional insulating material, not shown in FIG. 5, can be used to prevent a difference in potential between the ungrounded ends of two adjacent sections of the sheath from causing a current flow.

In prior art taught by Kirke and Searing, Re. 17,235, Mar. 12, 1929, the matter of induced current in the coaxial outer conductor (sheath) is brought forth. If a floating sheath surrounds a conductor carrying an alternating current, a potential difference proportional to the length of the sheath and to the time derivative of the current in the center conductor will be induced. If both ends of the sheath are connected to a good ground, current will flow in the sheath and cause a power loss. The method taught by Kirke, et. al. could be applied to the wiring arrangement shown in FIG. 5 in some cases. However, the symmetry of connection that is required by the Kirke, et. al. method would be difficult to arrange in outdoor overhead distribution powerlines.

Figure 6:
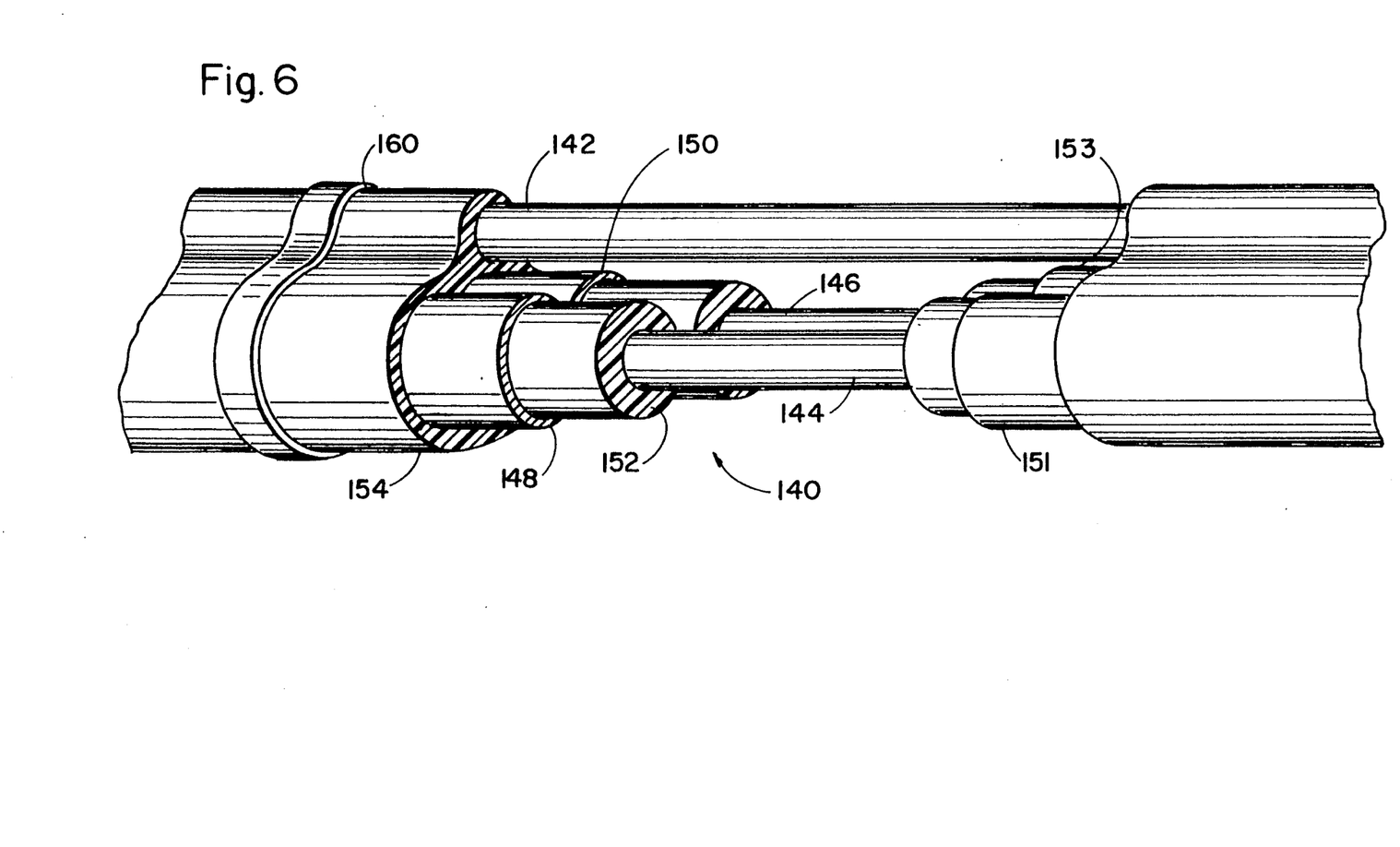
FIG. 6 of the drawing shows a dual coaxial cable with a supporting neutral cable.

A six phase generally coaxial cable made according to the embodiment of FIG. 5 could employ three sets of anti-phase generally paired coaxial conductors, where each such pair of conductors is fabricated as a cable assembly that provides the minimum conductor-conductor spacing compatible with dielectric safety requirements. FIG. 6 of the drawing shows a complete cable assembly 140 of this sort. This assembly also contains a cable 142 that serves both for mechanical support and as the neutral conductor. The anti-phase paired conductors 144, 146 can be placed much closer together in this assembly than they could in open wire construction. Therefore, the cancellation of the fringing magnetic field will be much better. Moreover, the shielding of the fringing electric field by shields segments 148, 150 and 151, 153 is complete except at the ends of segments where connections can be made 148, 150 is complete. This coaxial construction is also safer because accidental contact with the cable by a kite, ladder, or TV antenna will not complete a circuit to any phase conductor. The phase conductors are also less exposed to lightning than are the corresponding phase conductors in the open wire powerlines shown in FIGS. 2 and 3 because they are below and close to the grounded neutral support cable.

The construction of the coaxial phase conductor, starting from the center, comprises the inner conductor 144 of copper or aluminum; a dielectric insulation 152 between inner conductor 144 and outer conductor 148 and 151, the coaxial outer conductor 148, and 151 an outer plastic insulating sleeve 154. The outer plastic insulating jacket 154 is used to protect the inner parts of the line from weather and is also needed because the current flow in both the phase conductor and the anti-phase conductor cause a potential difference between the support cable 142 and the outer coaxial conductors 148, 150. 151, 153 also, without the outer plastic insulation, birds roosting on the powerline would experience a current flow through their claws.

The inner conductors 144, 146 and the support cable 142 can be made from smaller strands of wire as is typical for stranded cable construction. The outer conductor or sheath 148, 150, 151, 153 can be made from small strands of wire in a "braided" construction typical of low loss RF cables. Alternately, the outer conductors 148, 150, 151, 153 can be made from small strands of wire "spiral wrapped" around the plastic insulator as is often done with inexpensive signal cable used in audio equipment. Regardless of construction methods, the outer conductor or sheath 148, 150, 151, 153 is used only for electrostatic shielding. Since there is no current flow in the sheath 148, 150, 151, 153 it can be fabricated from lightweight and flexible conducting material. Also, the sheath material does not have to be ferromagnetic.

In the general case of a multi-phase powerline, magnetic coupling could induce a potential difference in a floating section of straight wire parallel to one of the phase conductors. This mechanism could cause current flow in the neutral conductor. However, in FIG. 6 the symmetrical location of the support cable 142, along with the identical currents in the anti-phase paired center conductors 144, 146 causes cancellation of the potential difference along the supporting cable.

The supporting and neutral cable 142 shown in FIG. 6 need not be cut at each supporting pole. At each pole, one or two of the support bands 160 can be cut to allow a supporting attachment (not shown) to be placed between the support cable 142 and the two outer conductors 148, 150. To tap the central phase conductors 144, 146 for connection of a distribution transformer, several of the support bands 160 can be removed and a short section of the coaxial cables dissected out of the cable assembly. Then, the load transformer primary can be connected as shown in FIG. 5, and the insulation of the center conductor and the outer conductors can be restored. As is known in the art of splicing overhead power and signal transmission cables, a small box filled with a plastic potting compound can be engineered to provide insulation and protection from rain or outer weather conditions. This same box could contain disconnect switches and lightning arrestors.

Although the present invention has been described with respect to two principle embodiments and several minor variations thereof, many alterations and modifications may be made without departing from the invention. Accordingly, it is intended that all such alterations and modifications be considered as within the spirit and scope of the invention as defined in the appended claims.

I claim:

1. A composite cable for the transmission of electric power at high voltage comprising
    a pair of parallel generally-coaxial cables, each said generally-coaxial cable including a first metallic conductor surrounded by a first dielectric material that electrically isolates said first metallic conductor from a plurality of segments of a coaxial second metallic conductor, wherein a said segment forms a coaxial conducting shield at a first predetermined distance from said first metallic conductor, wherein a said segment is longitudinally spaced from another of said plurality of segments by a second predetermined distance, wherein each said segment is coaxially surrounded by a second dielectric material, and
    a metallic support cable, disposed parallel to an axis of one of said pair of generally-coaxial cables and electrically isolated from said plurality of segments of a second metallic conductor of said one of said pair of generally-coaxial cables by said second dielectric material.

2. A composite cable of claim 1 wherein said metallic support cable is equidistant from said first metallic conductors of said pair of coaxial cables.

3. A composite cable of claim 1 wherein said metallic support cable is embedded in said second dielectric material.

4. A composite cable of claim 1 further comprising a support band located adjacent an end of a said segment and disposed around said metallic support cable and said pair of parallel generally-coaxial cables.

5. A composite cable for transmitting electric power at high voltage comprising a pair of parallel generally-coaxial cables, each said generally-coaxial cable comprising
    an axially positioned first metallic conductor surrounded by a first dielectric material and,
    a plurality of coaxial segments of a second metallic conductor, each said segment being located at a predetermined radial distance from said first conductor, each said segment being spaced apart from an adjacent said segment along said axis by at least a predetermined axial distance, and each said segment being coaxially surrounded by a second dielectric material.

6. A cable of claim 5 where an end of a said segment is formed proximate to an external support means that can support said composite cable above the terrain.

7. A cable of claim 5 further including a metallic support cable, disposed parallel to an axis of one of said generally-coaxial cables and electrically isolated from said outer coaxial conductor segments of said pair of generally-coaxial cables by said second dielectric material.

8. A cable of claim 7 where an end of a said segment is connected to said metallic support cable.

9. A cable of claim 7 where an end of a said segment is formed proximate to a external support for said cable.

10. A cable of claim 7 wherein said metallic support cable is equidistant from said first metallic conductors of said pair of coaxial cables.

* * * * *